Patented Oct. 23, 1928.

1,689,028

UNITED STATES PATENT OFFICE.

WILBERT A. HEYMAN, OF NEW YORK, N. Y.

PROCESS OF PRODUCING A CHOCOLATE MILK COMPOSITION.

No Drawing.  Application filed May 4, 1927. Serial No. 188,871.

This invention relates to a process of producing a new and improved beverage, more particularly to a process of producing a new and improved composition consisting principally of chocolate and milk ingredients.

One of the objects of the invention is to provide a process of the above character, such that the product produced when formed into a beverage, will give the latter a better flavor than has obtained in beverages of this character hitherto produced.

Another object is to provide a process of this character, wherein the solid ingredients are more easily dissolvable in water, so that there will be a beverage produced wherein practically all of the solid matter is either in solution or in a mulsified or in a colloidal state.

Another object of the invention is to provide a process which may be carried on more economically than processes of this character as hitherto carried on, and wherein less expensive ingredients may be employed in carrying out the same.

A further object of the invention is to provide a process of this character, wherein the product and the liquid beverage produced therefrom, will have superior keeping qualities than has obtained in similar beverages hitherto produced.

Other objects and aims of the invention more or less specific than those referred to above, will be in part pointed out in the course of the following description of the steps and the relation of each step to one or more of the others thereof employed in carrying out my process, and the scope of protection contemplated will be indicated in the appended claims.

In carrying out my process, I first provide a quantity of powdered cocoa, preferably cocoa having a very low fat content. I have found that cocoa having as low as a ten percent fat content is now available, and I preferably utilize this cocoa in powdered form having as low a fat content as is possible to obtain, say cocoa having not over a ten percent fat content. I then provide a quantity of either cold or warm water and add the cocoa powder thereto and stir the same thoroughly, so that all of the soluble constituents of the cocoa will go into solution. I then add to this mixture, a small quantity of bi-carbonate of soda for the purpose of neutralizing the astringency and acidity of the cocoa, a sufficient quantity of the bi-carbonate of soda being added to the mixture, so that the latter will be slightly alkaline to the litmus test. I also at this point in the process, add to the mixture a small quantity of gelatine. This is for the purpose of neutralizing the tannin which is present in the cocoa.

While I have described the use of soda bicarbonate as the neutralizing agent, other neutralizing agents may be, of course, employed, and it may be convenient to have the soda of bi-carbonate or other neutralizing agent, dissolved in the water before the cocoa powder is mixed therewith.

I then heat the mixture to a temperature ranging from 160° F. to 212° F. If heated to the latter temperature, I do not hold the mixture at that temperature for a period of longer than sixty seconds. The purpose of this heating is to so disintegrate the starch cells of the cocoa, that such parts thereof as are soluble, will go into solution, the cellular part thereof will be more easily digestible and will result in the mixture taking on a viscous condition. At this point, it may be noted that a sufficient quantity of alkali is used in carrying out this part of the process, so that the heated mixture will remain slightly alkaline in character after the heating step presently to be described, is carried on, whereby some of the fatty acids of the butter fats will be saponified and other acids neutralized. I find that the maintaining of this slightly alkaline character of the mixture results in giving the ultimate beverage a more delicate flavor, by reason of the fact that the astringency of the cocoa and the fatty and other acids therein, have been neutralized.

I then homogenize the mixture while still hot to break up the fat cells, whereby the fat is distributed through the homogenized mixture in such a way that the whole mixture is reduced to an emulsified or colloidal condition.

The process of homogenization is well known in the art. It consists in forcing the liquid under great pressure through very small orifices, the effect of which when used in connection with milk or starch products, is to break up the cellular structure, so that the solids in liquid are reduced to what may be termed "a colloidal state". The cellular matter, of course, remains undissolved, but they are reduced to such condition that they are more readily in suspension in the liquid.

In carrying out the above recited steps of my process, I preferably employ water and cocoa in the relation of one pound of cocoa to two and one-half pounds of water.

Having homogenized the mixture as above set forth, I add thereto a quantity of whole milk or skimmed milk, preferably the latter, because of its freedom from fat and because it is less expensive than the whole milk and is capable of retaining its flavor indefinitely without deterioration. This milk can be added either in its natural or in a concentrated state, that is to say, with a portion or all of its water content previously removed. This resultant mixture is then heated to temperatures of 140° F; 160° F. or 240° F. If heated to a temperature of 140° F. it is preferably held at such temperature for a period approximating thirty minutes. If heated to the temperature of 160° F. it is preferably held at such temperature for a period of approximately between five and twenty minutes. When heated to either of the temperatures of 140° F. or 160° F. this operation is for the purpose of pasteurization only. When the mixture is heated to a temperature of 240° F. it is maintained at that temperature for a period ranging between five and twenty-minutes. This heating is for the purpose of sterilization.

It will be understood, of course, that the normal acidity of the milk will be greater than the slight alkaline character of the aforesaid homogenized mixture, whereby the resultant product will have a slightly acid characteristic, due to the lactic acid in the milk.

This mixture is then put through any well known drying process now being practiced, for the purpose of eliminating the moisture and reducing the solids to powdered form. A sweetening substance, such as sugar in powdered form is then added to the powder produced by the aforesaid drying process, whereupon the composition has been reduced to its marketable form. As regards the addition of the sweetener, which is preferably cane sugar, although other sweetening substances may be employed, such addition can be made before the drying operation is carried on.

In producing a beverage from the aforesaid powdered composition, it is merely necessary to mix the same with cold water when the resultant mixture is ready for beverage purposes.

It will accordingly be seen that I have provided a process well adapted to attain, among others, all the ends and objects above pointed out in a most efficient manner, and wherein there is provided a foundation for a most delectable beverage and a beverage which is more digestible, smoother in character and richer in natural flavor than has hitherto been produced.

Wherever I have used the term "cocoa" in the foregoing specification and in the claims, I mean the product derived from the ripe cacao bean which has been put through the usual process of fermentation and drying, roasted and ground without the addition of any foreign substances, either previous to or after having been roasted and ground, and deprived of a portion of its fat by compression or other means and then re-ground until it is reduced to a finely comminuted state.

In carrying out the hereinbefore described process, I preferably employ powdered cocoa and milk, either natural or skimmed, in such proportions that the final mixture without the sweetener will consist of from about five to fifty percent of cocoa constituents and from ninety-five to fifty percent of milk solids. When the sweetener is added, the resultant mixture will preferably consist of approximately fifty-five percent of the sweetener and forty-five percent of combined cocoa and milk solids, the latter, of course, containing a small percentage of water, say three percent.

As many changes could be made in this construction without departing from the scope of the following claims, it is intended that all matter contained in the above description, shall be interpreted as illustrative only and not in a limiting sense.

Having thus described my invention, what I claim as new and desire to secure by Letters Patent, is:—

1. The herein described process of producing a beverage compound or the like, which consists in mixing cocoa powder having a low fat content with a suitable liquid, heating said mixture to a temperature sufficiently high to break up the starch cells of the cocoa, homogenizing said mixture, mixing the homogenized mixture with a lactil fluid, heating said resultant mixture to such temperatures as will either sterilize or pasteurize the same, and then removing the moisture from the liquid to reduce the solids to powdered form.

2. The herein described process of producing a beverage compound which consists in mixing cocoa and water, adding an acid neutralizing agent thereto, heating said mixture to a point sufficiently high to break up the starch cells of the cocoa, homogenizing said mixture, adding a lactil substance to said mixture, heating said resultant mixture to sterilize the same, and then removing the moisture from said mixture to reduce the solid content to powdered form.

3. The herein described process which consists in providing a homogenized mixture consisting of cocoa, water and a neutralizing agent, the starch cells of the cocoa having been broken up by heating the mixture before the latter is homogenized, mixing with said homogenized liquid a lactil substance, and then removing the moisture from said liquid.

4. The herein described process of producing a beverage compound or the like, which consists in providing a mixture of water, cocoa and a neutralizing agent, heating said mixture to break up the starch cells of the cocoa, a sufficient quantity of the neutralizing agent having been added to the liquid to give said mixture a slightly alkaline reaction, homogenizing said mxiture, adding a lactil substance to said homogenized mixture, sterilizing the resultant mixture and then removing the moisture therefrom.

5. The herein described process of producing a beverage compound or the like, which consists in providing a mixture of water, cocoa and neutralizing agent, heating said mixture to break up the cells of the cocoa, a sufficient quantity of the neutralizing agent having been added to the liquid to give said mixture a slightly alkaline reaction, homogenizing said mixture, sterilizing the resultant mixture, removing the moisture therefrom and then adding sugar to the dried mass.

6. The herein described process of producing a beverage compound or the like, which consists in mixing water, cocoa powder and an acid neutralizing agent and a tannin neutralizing agent, heating said mixture to break down the starch cells of the cocoa, homogenizing said mixture, adding a lactil substance thereto and then removing the water from said resultant mixture to reduce the latter to solid form.

In testimony whereof, I affix hereunto my signature.

WILBERT A. HEYMAN.